United States Patent [19]
Abell

[11] 3,788,201

[45] Jan. 29, 1974

[54] METHOD FOR ESTABLISHING VEHICLE IDENTIFICATION, SPEED AND CONDITIONS OF VISIBILITY

[76] Inventor: Frank Abell, 954 W. Hyde Road Blvd., Inglewood, Calif. 90302

[22] Filed: Dec. 14, 1970

[21] Appl. No.: 97,588

Related U.S. Application Data

[63] Continuation-in-part of Ser. No. 793,461, Jan. 23, 1969, abandoned.

[52] U.S. Cl. ................................. 95/1.1, 346/107
[51] Int. Cl. ............................................. G03b 17/24
[58] Field of Search ....... 95/1.1, 44 C; 346/107, 33; 343/8

[56] References Cited
UNITED STATES PATENTS

| | | | |
|---|---|---|---|
| 3,058,109 | 10/1962 | Berning | 346/107 VP |
| 926,912 | 7/1909 | Vogt et al. | 95/44 C |
| 3,148,015 | 9/1964 | Weaver | 346/107 VP |

*Primary Examiner*—John M. Horan
*Attorney, Agent, or Firm*—Donald Diamond

[57] ABSTRACT

A method is provided for producing a photographic record showing the identification of a moving vehicle, its speed, conditions of visibility, date and time. Conditions of visibility are established by periodically making a first photographic record of a target at a selected location along a highway. In one embodiment, identification and speed are established in a second photographic record by simultaneously photographing a vehicle moving along the highway in the vicinity of the target and a radar speed meter indicating the speed of the photographed vehicle. In a second embodiment, identification and speed are established by taking two pictures with the same photographic means of the identical portion of a moving vehicle in the vicinity of the target at a known time interval in order to make up a second photographic record, and measuring the relative sizes of the image of the identical portion of the vehicle in the two pictures; and thereafter calculating the speed of the vehicle by interrelating the time interval and vehicle image sizes with the image size of an object in a picture taken by said photographic means located at a known distance from the object, the object having an actual dimension corresponding to an actual dimension of the portion of the moving vehicle appearing in the second photographic record. The first and second embodiments for establishing identification and speed can be combined for purposes of corroborating the speed of the moving vehicle. Date and time are established by simultaneously photographing in all exposures making up the first and second photographic records date and time means showing the date and time at which the exposures are made.

4 Claims, 5 Drawing Figures

PATENTED JAN 29 1974 3,788,201
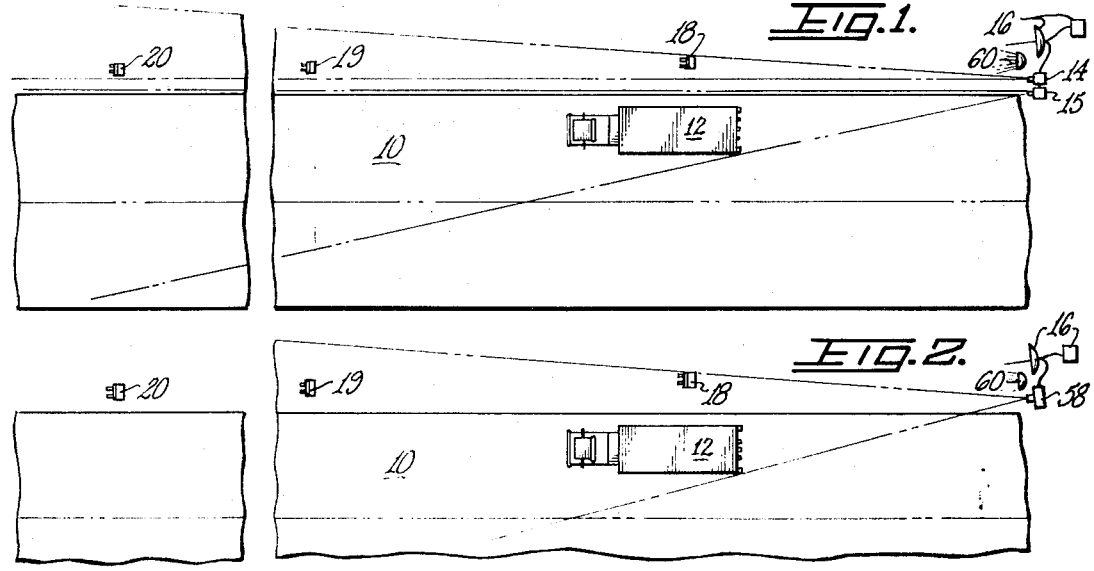
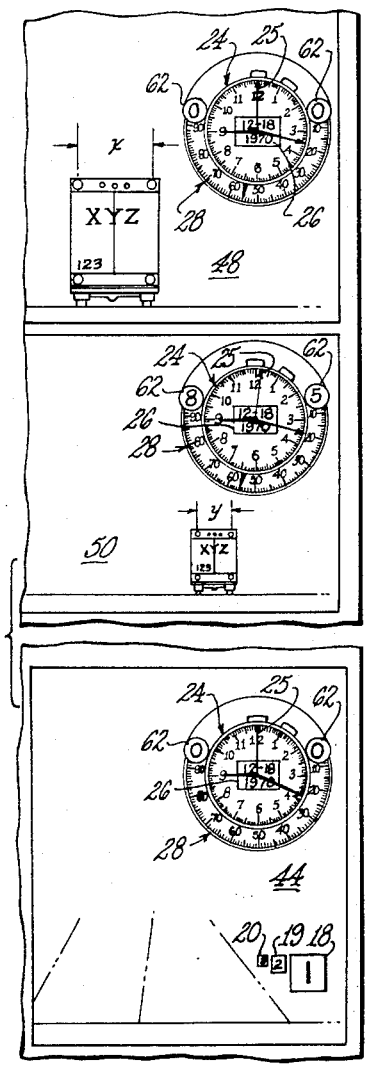
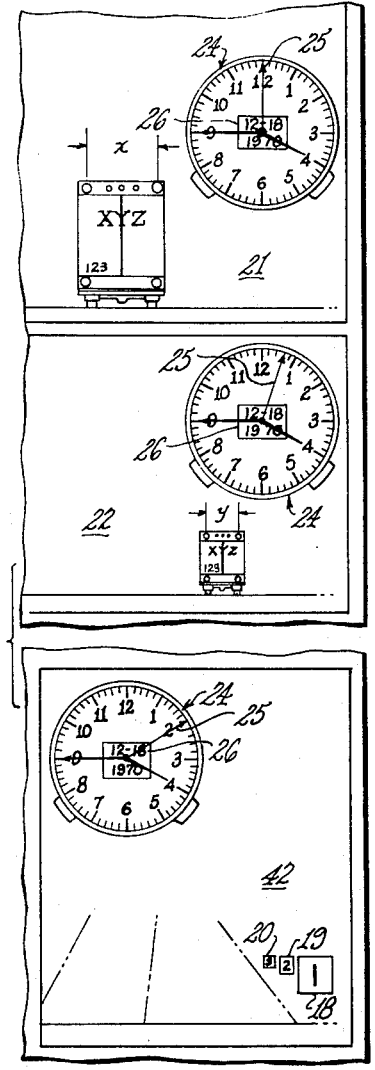
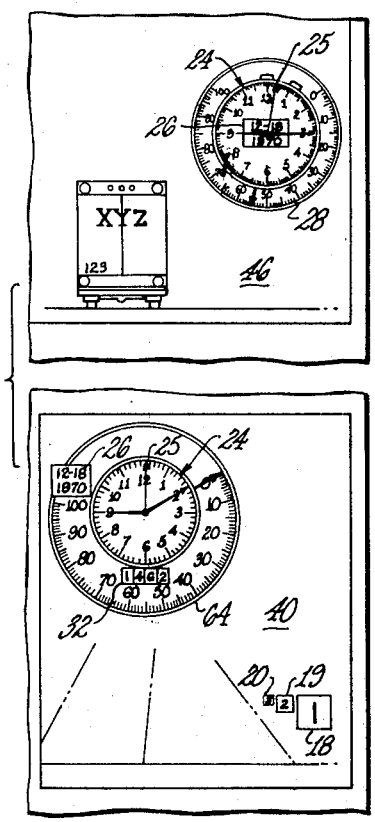
INVENTOR.
FRANK ABELL
BY
Donald Diamond
ATTORNEY

METHOD FOR ESTABLISHING VEHICLE IDENTIFICATION, SPEED AND CONDITIONS OF VISIBILITY

CROSS-REFERENCE TO RELATED APPLICATION

This application is a continuation-in-part of U.S. Patent Application Ser. No. 793,461, filed on Jan. 23, 1969, now abandoned and entitled "Method of Conducting a Traffic Survey and Record Thereof."

BACKGROUND OF THE INVENTION

The present invention relates generally to surveys of vehicular traffic on highways; and more especially to a procedure for establishing accurately the speed of a vehicle under conditions of reduced visibility, as may be encountered at night or in fog or under a combination of these conditions.

With the current building of expressways and the higher speeds of automobile and truck travel, the problems of unsafe driving and the dangers of overdriving visibility are of increasing seriousness.

Trucking companies and owners of commercial vehicles often have surveys conducted of truck traffic on highways for various purposes. Generally, this is done to check on driver performance, observation of laws and local ordinances, compliance with company rules, safe driving habits, and other traffic characteristics. A survey of this character is usually made by an independent observer in order to avoid any prejudice for or against the truck driver; but the observer must be able to produce reliable proof of the conditions observed. The latter is particularly important in the event that the survey is designed to disclose any improper or unsafe operating conditions observed.

One situation of interest is excessive vehicle speed at night or in foggy weather when visibility is reduced from daylight or ideal conditions. Because trucks are attempting to keep on a pre-set schedule, particularly if it is a long haul, drivers tend to maintain the fastest speed possible. If the schedule is based on the maximum speed possible under daylight or safe driving conditions, a driver is inclined to ignore the extra hazard involved in driving at the same speed in fog or at night and to maintain a higher speed than is safe under such conditions.

Especially when a report adverse to a particular driver or vehicle is made, it is necessary to produce a tangible record in order to support the findings or conclusions made. A visible, tangible record, if properly made, is impartial evidence and places no reliance on opinions or imperfect recollections of others as to what was seen or observed at a particular time in the past. Such a record may also be legal evidence and serve as a basis for traffic law enforcement. Obviously, a desirable type of record for this purpose is a photographic one.

PRIOR ART

In the prior art, U.S. Pat. No. 3,206,748 — Miller, entitled "Vehicle Speed Recording Apparatus" is directed to the combination of radar means and photographic means for automatically detecting the speed of a moving vehicle and photographing the vehicle along with indicia indicating speed, time and date so as to provide pictorial evidence of a traffic violation. Thus, the photographic record produced by the apparatus of Miller shows a vehicle, its speed, time and date, together with the surrounding environment within the range of the photographic instrument.

It would be advantageous to provide a method for producing a photographic record showing the identification of a moving vehicle, its speed, date and time under conditions of reduced visibility, as may be encountered at night and/or in fog, and which defnitively sets definitively conditions of visibility at the time the photographic exposures of the moving vehicle are made. Also, while radar speed meters are capable of high accuracy, they are not always entirely consistent or reliable, and, accordingly, it would be desirable to provide photographic means independent of radar for determining speed and for corroborating the reading of the radar speed meter.

OBJECTS

An object of this invention is to provide a new and improved method for producing a photographic record showing identification of a moving vehicle, its speed, date, time and conditions of visibility.

Another object of this invention is to provide a photographic method of the character described wherein vehicle identification is established under conditions of reduced visibility by recording an image of a selected vehicle with photographic means equipped with infrared sensitive film.

A further object of this invention is to provide a method of the character described wherein conditions of visibility are established by recording with photographic means equipped with panchromatic film an image of a target or target series located at a known distance from the photographic means.

A still further object of this invention is to provide a photographic method for determining vehicle speed which can be used independent of radar or together with radar to corroborate the reading of the radar speed meter.

SUMMARY OF THE INVENTION

These objects of the invention, as well as others not specifically mentioned, have been achieved by providing a method for establishing vehicle identification, speed and conditions of visibility that includes periodically making a first photographic record of visibility existing at a selected location along a highway and making a second photographic record, within the time span of the making of the first photographic record, of the identity and speed of a particular vehicle moving on the highway in the vicinity of said selected location. The record of visibility is typically made by photographing an illuminated target at a known distance from a camera with lighting of known value which is comparable to the illumination provided by the headlights of a vehicle. The record of identification and speed is made, in one embodiment, by simultaneously photographing a moving vehicle in the vicinity of the target and a radar speed meter indicating the speed of the photographed vehicle. In a second embodiment, the record of identification and speed is made by taking a series of at least two pictures, with the same photographic means, of the identical portion of the moving vehicle in the vicinity of the target at a known time interval and measuring the relative sizes of the image of the identical portion of the vehicle in two pictures and thereafter calculating vehicle speed by interrelating the time interval and vehicle image sizes with the image size of an object in a picture taken by said photographic means located at a known distance from the object, the object having an actual dimension corresponding to an actual dimension of the portion of the vehicle appearing in the two-picture record. A record can be obtained which is corroborative with respect to the speed of the moving vehicle by simultaneously photographing in the second embodiment a picture of a radar speed meter indicating the speed of the photographed vehicle. Date and time are established by simultaneously photographing date and time means on exposures of the target and the moving vehicle.

The first and second photographic records can be made with two different cameras at substantially the same location or a single instrument such as a magazine loading camera can be used. The visibility record is made with ordinary panchromatic film in order to give a more faithful rendition of what is visible to the human eye, while the second photographic record is made with film sensitive to the infrared in order that useful photographs can be taken under conditions which impair the transmission of visible light.

BRIEF DESCRIPTION OF THE DRAWINGS

The present invention will be better understood by reference to the following description, and to the annexed drawing, in which:

FIG. 1 is a diagrammatic plan of a short section of highway with a vehicle moving thereon, showing the relative location of two cameras, radar, illuminating means and the targets to be photographed to establish visibility.

FIG. 2 is a diagrammatic plan similar to FIG. 1 showing a single, magazine loading camera as the photographic means.

FIG. 3 is a photographic record showing in a first print a picture of a truck, a radar speed meter, date and time and showing in a second print a picture of a target series, a speedometer, date and time.

FIG. 4 is a photographic record showing in the upper two prints, sequential pictures of a moving vehicle, date and time from which speed of the vehicle can be calculated and showing in the lower print a picture of a target series, date and time. FIG. 5 is a photographic record similar to FIG. 4 and includes a picture of a radar speed meter in all photographs indicating the speed of the photographed vehicle.

DESCRIPTION OF A PREFERRED EMBODIMENT

Referring now to the drawing, and particularly to FIG. 1, there is shown schematically the arrangement of equipment involved and its relationship to the highway. A short section of highway is indicated generally at 10 with a truck 12 moving therealong from right to left of the figure. Adjacent one side of highway 10 at a position providing safety for the camera operators but close enough to the highway to provide a clear view of traffic on the highway, are located two cameras 14 and 15. Close by is radar equipment indicated generally at 16 in position to make a determination of the speed of a vehicle on the highway within the range of camera 15.

Cameras 14 and 15 are maintained at a relatively fixed position since, as will become apparent from further description, certain relationships must exist between the exposures taken by the cameras. The camera equipment may generally be classified as portable; but it is immaterial whether it is operated from a stationary vehicle or removed therefrom and supported on the ground. Preferably, cameras 14 and 15 are substantially side-by-side; but it is within the scope of the invention, as will become apparent, to space them farther apart than indicated in FIG. 1.

Although two cameras are shown in FIG. 1, equally good results are obtained when a single, magazine loading camera 58 is used as the photographic means as illustrated in FIG. 2.

At one side of the highway 10, there is located a series of targets 18, 19 and 20 at fixed and known distances from the photographic equipment. The targets are typically but not necessarily at the side of the road, but no particular location is required except that they can indicate the necessary visibility.

It is preferred to use a series of targets as indicated in order to obtain greater flexibility or information in the final photographic record by indicating gradations or changes in visibility. However, it is within the scope of the present invention to use but a single target located at a known distance, such as a distance from the camera equal to the maximum safe range of visibility available to a driver when travelling at the safe legal speed along the section of highway chosen for observation. More specifically, the distance between the single target and the camera would be equal to the stopping distance required for the vehicle at the maximum legal speed plus the distance travelled by the vehicle during the reaction time of the driver, which reaction time may be a more or less arbitrarily established fraction of a second. Also, it should be noted that the distance from the camera to the target can be verified by computation if the size of the target and the focal length of the lens of the camera are known.

Cameras 14 and 15 are motion picture cameras which have been modified for this particular type of service. Generally speaking, they are set to expose a single frame of film each time the shutter mechanism is actuated instead of a series of frames as is normal with motion pictures. In addition, they are modified to include on each frame of film an image of one or more other instruments, such as date means, a stopwatch, a speedometer, an odometer, or the speed meter of radar 16. The present invention is not concerned with the precise constructions of these cameras and consequently they are not shown in detail; but for typical constructions, reference may be had to my earlier U.S. Pat. Nos. 2,250,442, issued July 20, 1941, and U.S. Pat. No. 2,871,088, issued Jan. 27, 1959.

One step of the present invention is to photograph the target or targets. When there are three targets 18, 19 and 20, they appear as in the lower prints 40, 42 and 44 of FIGS. 3, 4 and 5. The advantage of a series of targets is that a better evaluation of visibility is established by showing in the picture how far from the camera a target is visible. Photographs of the target or targets are repeated at suitable intervals of time, the intervals being sufficiently frequent to show changes in visibility conditions. Assuming a foggy condition, if the visibility is relatively static, pictures of the targets at intervals of 15 to 30 minutes, for example, may be adequate to establish that a fog of certain density has settled over the highway 10 and that it has continued without noticeable change for the length of time covered by the series of photographs of the targets.

On the other hand, if the fog is changing in density so that visibility is increasing or decreasing, then the intervals between successive exposures should be reduced accordingly. Under these conditions, the intervals might be 10 minutes or even reduced to only 5 minutes. In any case, the intervals between successive exposures are governed by the visibility and any changes in it; and the time intervals are selected to be short enough to indicate the continued existence of a given degree of visibility between two successive exposures of the target series.

The photographic means used in making the photographic record may comprise two cameras, 14 and 15, as shown in FIG. 1, or a single, magazine loading camera 58 as shown in FIG. 2. The pictures of the roadside targets are designed to make a photographic record of visibility existing at a particular location along the highway 10; and for this purpose the conditions recorded should approximate as closely as possible visibility to the human eye. This is accomplished with accuracy by using ordinary panchromatic film in, for example, camera 14 of FIG. 1 or by using a cartridge containing panchromatic film in the magazine loading camera 58 shown in FIG. 2. Illumination of the targets is controlled to duplicate conditions existing for the driver. At night or in fog, it is preferably equal to the illumination afforded by vehicle headlights on low beam, as this is a minimum or limiting condition.

Illumination of the target is effected by positioning illuminating means 60 about 5 feet in front of the photographic means, or at that distance in front of the photographic means which is equivalent to the distance between the headlights of a vehicle and the driver's seat. The result is an accurate portrayal of what a driver can see from a vehicle. Of course, when the photographic equipment is mounted on an automobile, the headlights of the automobile can be used to illuminate the target series.

In the other step of the method herein described, a second photographic record is made to establish the identity and speed of a selected vehicle moving along the highway. The second photographic record is made using film sensitive to infrared, in order to obtain a resultant picture producing a visible image in spite of the presence of fog or other conditions producing impaired visibility. When the photographic means comprises two cameras shown in FIG. 1, then one camera as, for example, camera 15 will be equipped with infrared sensitive film and the second camera 14 will be equipped with panchromatic film. However, when a magazine loading camera such as that shown in FIG. 2 is used as the photographic means, then a cartridge containing infrared sensitive film is inserted into the camera for making the second photographic record and is replaced with a cartridge containing panchromatic film for making the first photographic record. For the purposes involved here, the second photographic record is made under visibility conditions which are portrayed by the exposures made on panchromatic film. Consequently, the second record made on infrared sensitive film must be made sufficiently close in time and space to the record made on panchromatic film that there is a known definite correlation between the visibility recorded in the first record and the conditions under which the second record is made. When a magazine loading camera is used, the lens setting should be adjusted to accomodate the particular film being used.

In one aspect of this invention, identification and speed of a moving vehicle are established in a photographic record such as that shown in the upper photographic print 46 of FIG. 3 by simultaneously photographing the vehicle and a radar speed meter indicating the speed of the photographed vehicle. Speed is determined by a radar installation 16 which, by reflection of a radar beam from the moving vehicle, produces an indication of speed on the speed meter. The image of the speed meter is recorded and is shown in FIG. 3 as an image 28 around the image of a timepiece 24.

In a second aspect of this invention, identification and speed of the selected vehicle are established photographically by taking a series of at least two pictures, with the same photographic means, at a known time interval of the identical portion of the moving vehicle in order to make up a second photographic record as shown in the two upper prints in FIG. 4; measuring the relative sizes of the identical portion of the vehicle in two pictures; and calculating the speed of the vehicle by interrelating the time interval and vehicle image sizes with the image size of an object in a picture taken by said photographic means located at a known distance from the object, the object having an actual dimension corresponding to an actual dimension of the portion of the moving vehicle appearing in the second photographic record.

The photographic record of identification and speed as shown in FIG. 4 comprises two closely-spaced pictures 21 and 22 of the same vehicle. The first is taken shortly after the vehicle moves into the range of the camera and the second is taken after the vehicle has moved on down the highway. Of course, a third and succeeding exposure can be made of the same vehicle if desired; but under conditions of lowered visibility, an opportunity may be afforded for only a series of two exposures; and two resultant pictures are sufficient for the record.

The two exposures include indentical parts of the vehicle. This is done so that the size of a given portion of the vehicle can be measured on the two prints and the distance travelled by the vehicle between the two exposures can be calculated from the change in size. For example, commercial trucks and trailers have a standard maximum body width. By comparison of the recorded dimension of the body width in the successive pictures 21 and 22 with the image size of an object having an actual dimension corresponding to body width in a picture taken by photographic means located at a known distance from the object, the focal length of the lens in the photographic means for all pictures being the same, it is possible to calculate the distance travelled in the interval between the two exposures. Thus, if distance from the camera and image size are known for an object having a particular dimension, then in another picture of that object its distance from the camera can be calculated from its image size, since the image sizes of the particular dimension in the two pictures are inversely proportional to the distance of the object from the photographic means. If the visibility is sufficiently reduced that the body of the truck cannot be seen in the second exposure, resort may be had to other dimensions. For example, in exposure 21, in FIG. 4, the distance x indicates the distance between two lights carried at the top of the truck body. In exposure 22 the distance between the two lights is reduced to the dimension Y.

The first exposure from which picture 21 is printed is made with an infrared flash bulb, electronic flash gun or similar source of infrared illumination. The truck is close and a picture of the body is obtained that reveals a name, number or other identification. The second exposure may be made without a flash source; but it is useful as it will record the lights on the rear of the vehicle. For this purpose, it is better not to use a flash or other added illumination, and the lights provide desired dimensions.

The time interval between the two successive exposures must be known in order to calculate vehicle speed. This time interval may be established or determined in various ways. For example, an automatic interval timer may make the second exposure at a known fixed time after the first one, for example, 2 seconds.

However, it is preferred to include in both the exposures 21 and 22 a record of the time by photographing a suitable timepiece, for example, a stopwatch having a sweep second hand. The image of the stopwatch is shown at 24 with the sweep second hand at 25. The hour and minute hands indicate the time of day at which the photographic record is made. There may also be added a legend 26 showing the month, day and year for additional identification purposes.

Without going into detail, it will be apparent that if the distance travelled by the vehicle between exposures 21 and 22 can be calculated, then from knowledge of the time interval between exposures 21 and 22 as revealed by the movement of sweep hand 25, the actual road speed of the vehicle can be calculated. A stopwatch is sufficiently accurate when the exposure interval is of the order of 2 seconds or more. When the interval must be reduced to less than 2 seconds, an electronic timer 62 displaying fractions down to one-hundredths of a second, such as that shown in connection with the timepiece in print 48, should be used. The time and date means and the radar speed meter may be recorded at any position of the film.

Since one might challenge the conclusion drawn from a record of merely the timepiece showing the interval between the two exposures, and since radar readings, while capable of high accuracy, are not always entirely consistent or reliable and, therefore, subject to challenge, it is advantageous to combine the radar method and photographic method for determining speed by including a picture in the photographic method of a radar speed meter indicating the speed of the photographed vehicle as shown in FIG. 5. Therefore, when the speed indicated on meter 28 confirms the result obtained from calculations made using image size measurements and time from timepiece 24 in prints 48 and 50 of FIG. 5, there is confirmation and corroboration of the speed which substantiates the correctness of the conclusions reached. Hence the preference for two exposures to make the second photographic record.

It will be apparent that the first photographic record showing conditions of visibility, the lower prints 40, 42 and 44 in FIGS. 3, 4 and 5, should also include a timepiece 24 as well as day, month and year indicia 26 in order to show correlation between the first and second photographic records. It may also be desirable to indicate some correlation in location; and this can be accomplished by including in the first photographic record an odometer reading 32 as shown in print 40 in FIG. 3. Since the odometer is associated with a speedometer, print 40 also includes a picture of a speedometer 64 in which the dial is at 0 because the vehicle is stationery when the photographs are taken. By recording the odometer reading at a known point of departure, for example, a garage, and then later at the point where the vehicles stop in order to set up the photographic equipment, the location at which the pictures are taken can be established. The continued constant reading of the odometer in the first photographic record indicates that all pictures are taken at the same place and are not taken at other more remote locations. Other means of establishing identity of location of the exposures for the two records can include terrain features, buildings, bridges, and other distinctive and recognizable but non-movable objects.

While in the foregoing drawing and description there has been shown and described the preferred embodiment of this invention, it will be understood, of course, that minor changes may be made without departing from the spirit and scope of the invention as claimed.

I claim:

1. A method for providing a photographic record showing the identification of a vehicle, its speed and conditions of visibility which comprises:

positioning photographic means along a selected section of a highway;

locating at least one target along said highway, said target being spaced at a known distance from said photographic means;

periodically making a first photographic record of said target with said photographic means on panchromatic film while said target is simultaneously illuminated by lighting substantially equivalent to the headlights of a vehicle in order to show conditions of visibility at said selected section of highway;

making a second photographic record with said photographic means on infrared sensitive film, showing the identification and speed of a selected vehicle moving on said highway in the vicinity of said target;

simultaneously photographing in all exposures making up the first and second photographic records a timepiece to show the time of day at which such exposures are made; and correlating said first and second photographic records with respect to the time at which such are made whereby a photographic record is established showing vehicle identification, speed and conditions of visibility.

2. A method according to claim 1 wherein the preparation of the second photographic record includes the step of simultaneously photographing said moving vehicle and a radar speed meter indicating the speed of the photographed vehicle.

3. A method according to claim 1 wherein identification and speed of the moving vehicle are determined by:

taking a series of at least two pictures, with the same photographic means, at a known time interval of the identical portion of the moving vehicle in order to make up a second photographic record;

measuring the relative sizes of the image of the identical portion of the vehicle in two pictures; and calculating the speed of the vehicle by interrelating the time interval and vehicle image sizes with the image size of an object in a picture taken by said photographic means located at a known distance from the object, said object having an actual dimension corresponding to an actual dimension of the portion of the moving vehicle appearing in the second photographic record.

4. A method according to claim 3 which includes the step of simultaneously photographing in all exposures making up the second photographic record a picture of radar speed meter indicating the speed of the photographed vehicle.